(12) United States Patent
Richey et al.

(10) Patent No.: US 12,579,760 B2
(45) Date of Patent: Mar. 17, 2026

(54) DIGITAL CONTENT PLATFORM INCLUDING METHODS AND SYSTEM FOR RECORDING AND STORING DIGITAL CONTENT

(71) Applicant: Gravity Jack, Inc., Liberty Lake, WA (US)

(72) Inventors: Jennifer Richey, Liberty Lake, WA (US); Aaron Luke Richey, Liberty Lake, WA (US); Ryan Kennedy, Spokane Valley, WA (US); Marc Rollins, Spokane, WA (US); Brandon Millsap, Spokane, WA (US); Carrie Millsap, Spokane, WA (US); Abigail Richey, Liberty Lake, WA (US)

( * ) Notice: Subject to any disclaimer, the term of this patent is extended or adjusted under 35 U.S.C. 154(b) by 0 days.

(21) Appl. No.: 18/224,053

(22) Filed: Jul. 19, 2023

(65) Prior Publication Data

US 2024/0029366 A1     Jan. 25, 2024

Related U.S. Application Data

(60) Provisional application No. 63/390,290, filed on Jul. 19, 2022.

(51) Int. Cl.
*G06T 19/00*      (2011.01)
*G06Q 20/06*      (2012.01)
(Continued)

(52) U.S. Cl.
CPC ......... *G06T 19/006* (2013.01); *G06Q 20/065* (2013.01); *G06Q 20/123* (2013.01); *G06T 13/20* (2013.01); *G06Q 2220/00* (2013.01)

(58) Field of Classification Search
CPC ........ G06T 13/20; G06T 13/40; G06T 19/006
See application file for complete search history.

(56) References Cited

U.S. PATENT DOCUMENTS

| | | | | |
|---|---|---|---|---|
| 5,956,716 A | * | 9/1999 | Kenner | ................ H04N 21/222 |
| 2010/0289875 A1 | * | 11/2010 | Newton | ................... H04N 5/85 |
| | | | | 348/E13.001 |

(Continued)

OTHER PUBLICATIONS

Gupta et al., Identifying Security Risks in NFT Platforms, arXiv, Apr. 2022 (Year: 2022).*

*Primary Examiner* — Charles Tseng
(74) *Attorney, Agent, or Firm* — Neo IP

(57) ABSTRACT

The digital content platform is a series of groundbreaking technologies, namely its innovative Blockchain-based scarcity liking system, its 3D augmented reality recording methodology, and its storage and transmission mechanism of that 3D content. The technology behind the present invention solves multiple issues that currently exist within the technology space to democratize innovation and technology for the masses. The present invention uses cryptocurrency and Blockchain technology to implement a liking system that allows creators to mint their content as an NFT that users can then "like" with Carbon12 cryptocurrency, effectively restoring creators to a position of ownership over their data and allowing users to view content in an ad-free environment catered to their experience. Additionally, the platform features a recording method that enables users to create 3D digital content and post it to the platform so that users can display content in their physical environment, creating a holographic experience that feels as though the creator is right there with the user. The platform implements a revolutionary method of storage that stores 3D files at roughly the same size as a traditional video file. Additionally, in a fully owned ecosystem (like the platform), data can be transmitted more quickly and almost as compact as traditional video, making the present invention more cost and time-efficient while transmitting higher resolution content than current methods of sending 3D content.

16 Claims, 4 Drawing Sheets

(51) Int. Cl.
  *G06Q 20/12* (2012.01)
  *G06T 13/20* (2011.01)

(56) References Cited

U.S. PATENT DOCUMENTS

| | | | |
|---|---|---|---|
| 2019/0206128 A1* | 7/2019 | Logan | H04N 21/21805 |
| 2021/0065420 A1* | 3/2021 | Orvalho | G06T 15/04 |
| 2021/0099711 A1* | 4/2021 | Tourapis | H04N 19/147 |
| 2022/0351279 A1* | 11/2022 | Cardenas Gasca | G06T 19/006 |
| 2022/0351280 A1* | 11/2022 | Cardenas Gasca | |
| | | | G06Q 30/0643 |
| 2023/0118312 A1* | 4/2023 | Sun | G06Q 20/389 |
| | | | 705/69 |

* cited by examiner

100

200

Figure 3:
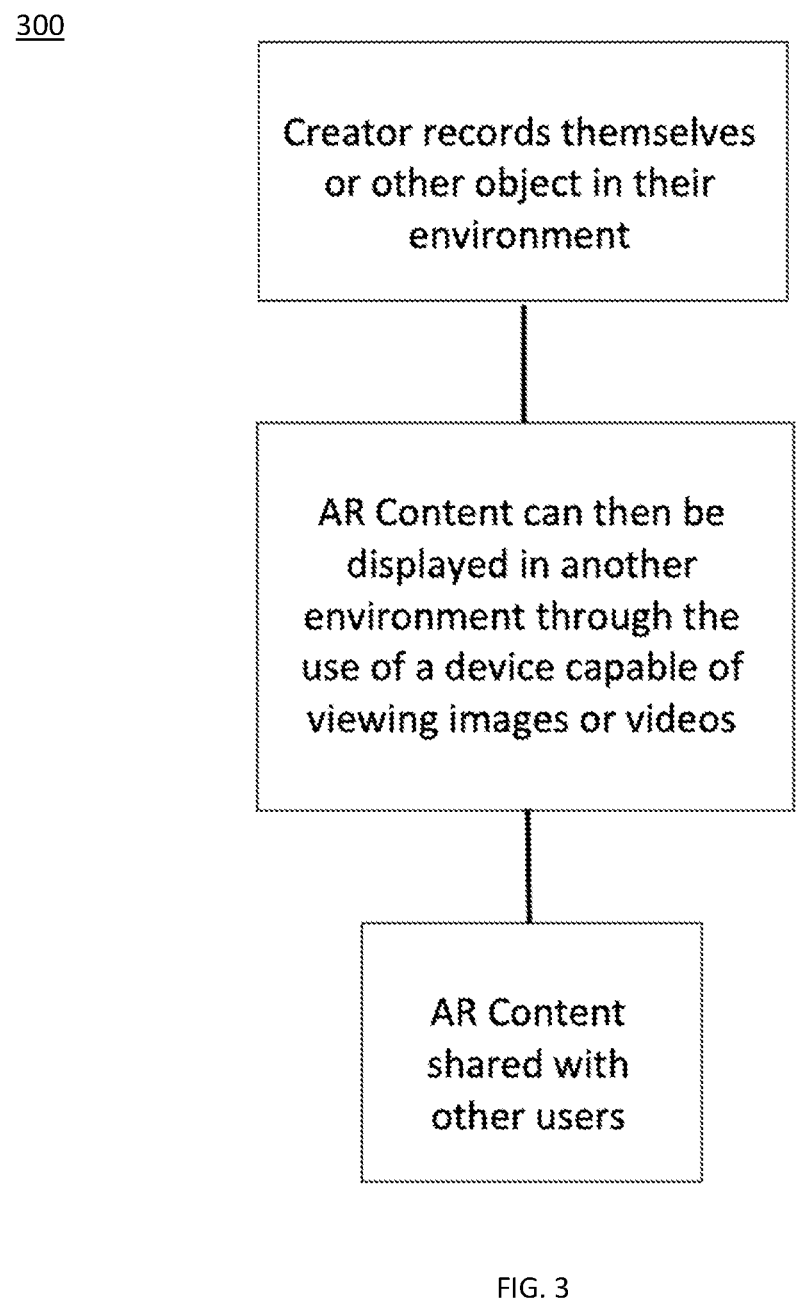

300

Creator records themselves or other object in their environment

AR Content can then be displayed in another environment through the use of a device capable of viewing images or videos AR Content shared with other users

Creator records themselves or another object in their environment

AR Content shared with other users

AR Content can then be displayed in another environment through the use of a device capable of viewing images or videos

DIGITAL CONTENT PLATFORM INCLUDING METHODS AND SYSTEM FOR RECORDING AND STORING DIGITAL CONTENT

BACKGROUND OF THE INVENTION

1. Field of Invention

The invention generally relates to the recording, storage, and transmission of augmented reality content and transactions via cryptocurrency.

2. Description of Related Art

Over the last decade, digital content, augmented reality, and digital currency has become a staple in the tech. industry and the general public. The advancements in augmented reality have allowed users to blend computer-generated objects with the real world environments. Similarly, the progress in cryptocurrency and Blockchain has allowed users to make real-world transactions via the digital world. With these advancements, the amount of data recorded by users to create digital content has become more challenging to store and transmit.

Current barriers to creating, storing, and transmitting 2D and 3D digital content have prevented progress toward broader adoption of digital content in everyday use. Currently, digital content creation is expensive and complicated, making it inaccessible to everyday users. Applying filters on social media apps like Snapchat or Instagram is the closest technology available to individuals to create personalized digital content. However, this has its limitations. Current augmented reality experiences are limited by the single viewing angle of a device's camera. Another downfall is that features like depth are easily thrown off by bad lighting, rendering inaccurate or incomplete models.

The addition of a LiDAR sensor to the iPhone 12 Pro was groundbreaking for the world of augmented reality as it generates an accurate depth map and can place augmented reality models precisely within the user's environment. While LiDAR sensors integrated with a device enable user interaction with digital content, no method currently allows users to create personalized digital content. Similarly, augmented reality in gaming and measuring ultimately trivializes the impact of this innovative technology and does not allow the user to create personalized digital content.

Additional barriers hinder progress toward broader adoption of digital content in physical spaces. While digital content assists in filling this void, barriers exist that prevent augmented reality from being fully utilized. These barriers include latency in data delivery and network congestion resulting from insufficient bandwidth. Nevertheless, these barriers have not deterred users' desire for this technology. As augmented reality becomes more prevalent, wearable computers, such as smart glasses, that are convenient and comfortable for users will be in high demand. Wearable computers and HMDs (smart glasses) to view digital content in the physical world (augmented reality) will require a level of CPU that smaller devices don't have. As such, software must also adapt to wearable's increasing computing needs.

Current methods and systems of storing 3D files and their animations in a video take up massive amounts of data space. This type of data makes for large files that impede the ubiquitousness of the coming age of content in augmented reality. No user wants to store a file that takes up their entire storage space or wait for a massive file to download before viewing the content. Similarly, because of the size of the 3D file, the transmission from a server to a user or from a user to another user can be expensive and time-consuming. Further, to transmit large 3D files, the resolution must be decreased, resulting in the end-user receiving a low-resolution file. Additionally, current multi-device recording intended for 3D augmented reality rendering requires fixed camera angles that inconvenience the user, making digital content creation for the average individual out of reach.

The present invention democratizes innovation and technology for the masses by allowing users to mint their content as an NFT and restoring creators to a position of ownership over their data.

SUMMARY OF THE INVENTION

The present invention overcomes these and other deficiencies of the prior art by providing a platform that allows for augmented reality creation, storage, and transmission capabilities and for users to reclaim their data autonomy through implementing decentralized and democratized Web3.0 principles. The present invention presents a solution for issues surrounding limited processing capabilities in small devices by creating a platform comprising a method of storage that stores 3D files at roughly the same size as a traditional video file. It creates a platform that allows data to be transmitted more quickly and almost as compact as a conventional video file, reducing the cost and time to transmit larger 3D files without decreasing content resolution. The platform utilizes Blockchain for microtransactions of cryptocurrency, preferably, Carbon12, and restores users to a position of ownership over their computation power, content, and data. In addition, it allows users to create personalized 3D digital content rather than rely on social media apps like Snapchat or Instagram.

The present invention describes a platform that allows users to create, store, and transmit 2D, 3D, and augmented reality content, including audio content. This platform creates a community where users may comment on, like, share, create, and sell digital content. Because of the platform's unique storage capabilities, users are provided with the ability to create their own digital content and share it quickly with other users without losing content quality. Users are provided with the ability to create content using digital images in the platform's repository or by capturing/creating their own images. The platform enables users to mint their digital content as NFTs and sell them to other users by exchanging cryptocurrency. Users can follow, like, and share other users and their content.

Additionally, it provides a recording method that enables users to create 3D digital content and post it to share with users. The present invention implements a method of storage that stores 3D files at roughly the same size as a traditional video file. This storage method allows data to be transmitted quickly and compactly, making the present invention more cost and time-efficient while transmitting higher resolution content than the current methods of transmitting 3D content.

The present invention describes technology for improving and personalizing digital content to allow users to create impactful personalized digital content. The technology described herein allows user interactions with the digital content presented on the platform to directly impact the success of another user's digital content. It eliminates the ability to buy value from the platform to increase the worth of their digital content by creating a direct correlation between the digital content and user interactions.

The present invention also solves the issue of limited imagery caused by recording from a single camera view by providing a recording methodology that combines point cloud data from non-fixed cameras. This methodology finds common features across the plane and determines the intersection point of CMOS (photogrammetry) and LiDAR data. The recording mechanism uses RLUE to assess the attitude of the recording device and the distance between multiple recording devices, eliminating the need for fixed camera angles that would inconvenience the user. Other methods of attitude include object identification for correlation of the object recorded.

The present invention allows users to participate in valuing content via NFTs by encouraging users to prioritize which content is worth popularizing while financially rewarding creators. Creators can upload content as an NFT that users can purchase through micro amounts of cryptocurrency or Carbon12 cryptocurrency. Users can "vote" on NFTs by contributing cryptocurrency. This voting system determines which NFT s are immutably stored. This feature allows users to become participants in content more meaningful than basic consumption while incentivizing creators to post content that will impact users beyond the scope of a simple like or comment. The purchase of content as NFTs serves as a promotion mechanism for posts and a traditional liking system, giving users a substantial say in content curation. Since there is no paid advertising and users are the only source of funding, creators are encouraged to produce quality content. As such, the popularity and value of the 3D digital content are dependent on its true popularity based on user likes rather than on which creator paid for more advertising.

The foregoing and other features and advantages of the invention will be apparent from the following, a more particular description of the invention's preferred embodiments and the accompanying drawings.

BRIEF DESCRIPTION OF THE DRAWINGS

For a complete understanding of the present invention, the objects, and advantages thereof, reference is now made to the ensuing descriptions taken in connection with the accompanying drawings briefly described as follows:

FIG. 3 illustrates a system of valuing AR content according to an embodiment of the invention.

DETAILED DESCRIPTION OF PREFERRED EMBODIMENTS

Figure 1:
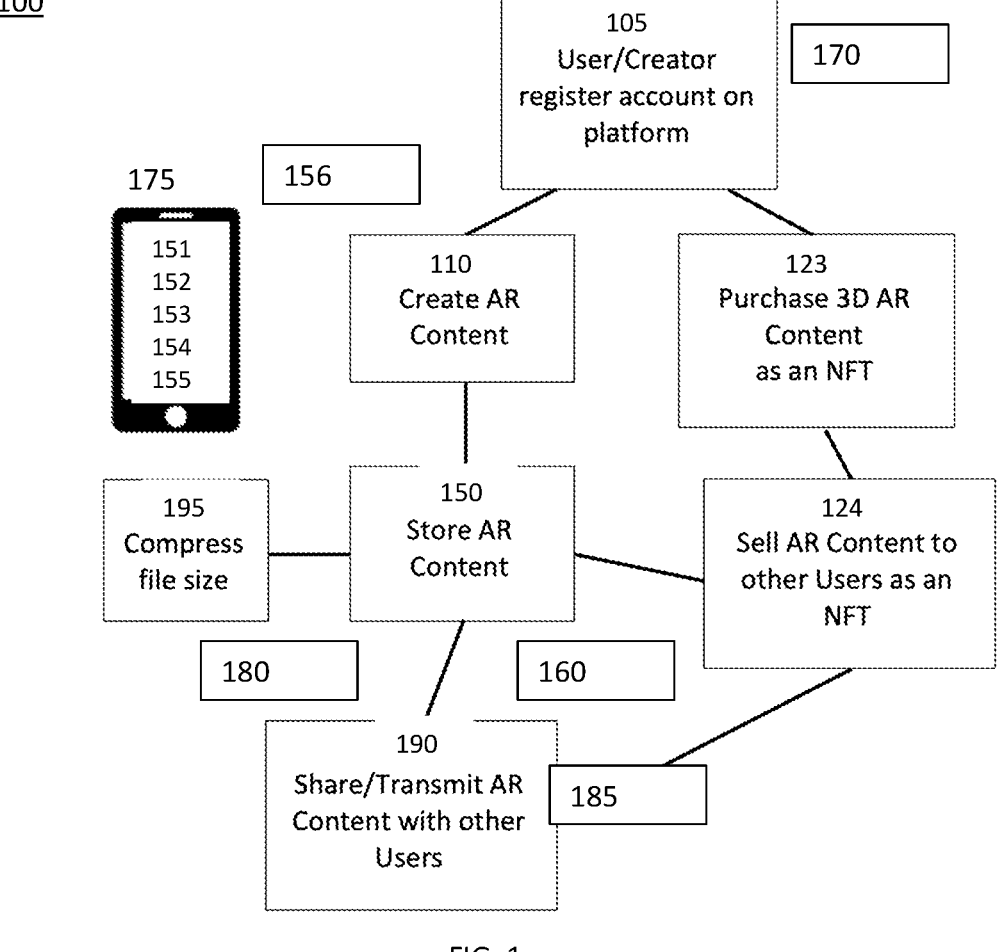
FIG. 1 illustrates a system of creating, storing, and sharing AR content, according to an embodiment of the invention.

Preferred embodiments of the present invention and their advantages may be understood by referring to FIGS. 1-4, wherein like reference numerals refer to like elements. The described features, structures, or characteristics of the invention may be combined in any suitable manner in one or more embodiments. It will be apparent to those skilled in the art that various modifications and variations can be made to the present invention without departing from its spirit and scope. Thus, the current invention is intended to cover modifications and variations consistent with the scope of the appended claims and their equivalents.

FIG. 1 illustrates an augmented reality ("AR") content platform 100 for creating, storing, and sharing AR content. The platform 100 enables users to create custom AR content. The platform 100 implements numerous modules for creating and sharing AR content. As such, AR content herein refers to any digital content or digital media that appears to be in a physical embodiment to a user.

The computing device 175 houses a processor 151 that performs a set of operations on information as specified by computer program code 152. The computer program code 152 is a set of instructions or statements providing instructions for the operation of the processor 151 and/or the computer system to perform specified functions. The code 152 for example, may be written in a computer programming language that is compiled into a native instruction set of the processor 151. The code 152 may also be written directly using the native instruction set (e.g., machine language). The set of operations include bringing information in from the bus 153 and placing information on the bus 153. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor 151 is represented to the processor 151 by information called instructions, such as an operation code of one or more digits. A sequence of operations to be executed by the processor, 151 such as a sequence of operation codes, constitute processor instructions, also called computer system instructions or, simply, computer instructions. Processors 151 may be implemented as mechanical, electrical, magnetic, optical, chemical or quantum components, among others, alone or in combination.

The computing device 175 includes a memory 155 coupled to bus 153. The memory 155, such as a random access memory (RAM) or other dynamic storage device, stores information, including processor instructions. Dynamic memory allows information stored therein to be changed by the computing device 175. RAM allows a unit of information stored at a location called a memory address to be stored and retrieved independently of information at neighboring addresses. The memory 155 is also used by the processor 151 to store temporary values during execution of processor instructions. The computing device 175 also includes a read only memory (ROM) or other static storage device coupled to the bus 153 for storing static information, including instructions, that is not changed by the computing device 175. Some memory 155 is composed of volatile storage that loses the information stored thereon when power is lost. Also coupled to bus 153 is a non-volatile (persistent) storage device 154 for storing information, including instructions, that persists even when the computing device 175 is turned off or otherwise loses power. Information, including instructions, is provided to the bus 153 for use by the processor 151 from any external input device 156, such as a keyboard containing alphanumeric keys operated by a human user, or a sensor. In an embodiment of the present invention, there is a removeable memory 155 embodied as a thumb drive that stores data collected by the present invention.

The present invention provides a method 100 of storing digital content, as shown in FIG. 1, that allows users to interact with content, create content, and share content without overloading the hardware of a computing device.

The platform 100 can use graphics installed on the platform 100 or graphics provided by the user. For example, the platform 100 has a pre-populated list or gallery of stock graphics for users to use 170, while it also can sync to a computing device 175 and share a user's files. The pre-populated list 170 features images such as shapes, logos, styles, themes, sponsors, brands, or any other similar digital content. User's files may also be uploaded onto the platform 100 for custom digital content creation. As an example, a user uploads a photo from a computing device 175 onto the platform 100. As shown in 110, users may also create custom graphics by recording themselves or other objects in the user's current environment. These recordings may be used to create AR 2D or 3D content.

A storage module 150 decreases AR content bandwidth by compression algorithms and allows users to share and transmit AR content to other users by storing a static 3D object with animations and a skeletal structure 160. The skeletal structure 160 advantageously allows the platform to send large AR files to other users without delays. The storage module 150 efficiently only saves changes in coordinates of point cloud data on a frame-by-frame basis 180. The frame-by-frame storage 180 method beneficially animates at a point cloud rather than level than the entire digital content model itself. For example, AR content is separated into separate and individual files and, at a further level, separate frames. Frame one of each file can store the entire 3D object and create an inference of every potential point cloud orientation. In real-time, the platform via the storage module 150 reads each frame, one after another, and only saves changes in the point cloud data from the previous frame. The storage module 150 uses every orientation detailed in frame one as a reference point. Efficiently, the digital content does not need to store every point cloud orientation in every frame, as is the current case with video files.

Accordingly, each file stored via the storage module 150 can combine multiple streams of data, for example, a MPEG accessible file on an as-needed basis. As an example, a first stream, stream 1, is the default 2D version of the video file and camera orientation, while a second stream, stream 2, contains the 3D model and the changes in point cloud data. Because stream two is only text and math data, it can be compressed easier, quicker, and more efficiently to keep the file size small to assist storage and transmission of the digital content. Because the present invention stores a default 2D view in stream one of, for example, an MPEG or similar file, all content created and stored using the platform's protocols will be backward compatible. Meaning, that users can view content created for 3D display in 2D on any streaming platform because the data resides on a separate stream accessible upon user need. The digital content is viewable on computing devices with different installed software, software other than the software on the device that created the digital content.

After custom AR content is created, a user uploads 190 their desired content to the platform 100. The platform 100 converts the file into an AR format or AR compatible format via a converting module 195. The converting module 195 converts the image or stock image into AR content or to be AR compatible. AR compatible means producing content that appears to users as though the content is in a physical embodiment, yet it is purely digital. A user, however, views the digital content as appearing physically for example, a mobile phone or any other smart device, including said computing device 175.

The platform 100 allows users to share their digital AR content with other users 190. Other users can connect to the platform via WIFI, Bluetooth, or any other internet connectivity through computing devices 175. Computing device

175 refers to any computer, desktop computer, laptop, notebook, iPad, or any other similar smart device that is connected on a network. AR content can be transmitted similarly to how it is stored. While sending a standard video file requires that each megabyte of every frame be transmitted to the user, a sharing module 185 sends only one frame in its entirety, with the sequential frames only including and transmitting changes in point cloud data. This results in the transmission of, for example, MPEGs that are smaller, more cost-effective, and higher resolution than traditional video files with faster feedback time.

Additionally, the sharing module 185 shares sensor data, such as but not limited to CMOS, LiDAR, accelerometer, gyroscope, time-of-flight, GPS, and other similar sensor data between users in a network. Beneficially, the average consumer device has new capabilities that were previously outside of the device's computing power and bandwidth. For example, self-driving vehicles can share accelerometer, GPS, and time-of-flight data from other devices to help maneuver through traffic. Another exemplary example would be sharing CMOS data at concerts or sporting events to get camera angles that were not visible from every vantage point.

In an exemplary method of the present invention and with reference to FIG. 1, a user or AR content creator registers an account on the platform 105. After registration, custom user AR content is created and uploaded under an account 123, where other users can purchase 124 3D AR content in an NFT format. After AR content is created and uploaded, various modules compress the file size, store the AR content on the platform, and convert the content to NFT format. Lastly, users can share and transmit AR content with other users.

Figure 2:
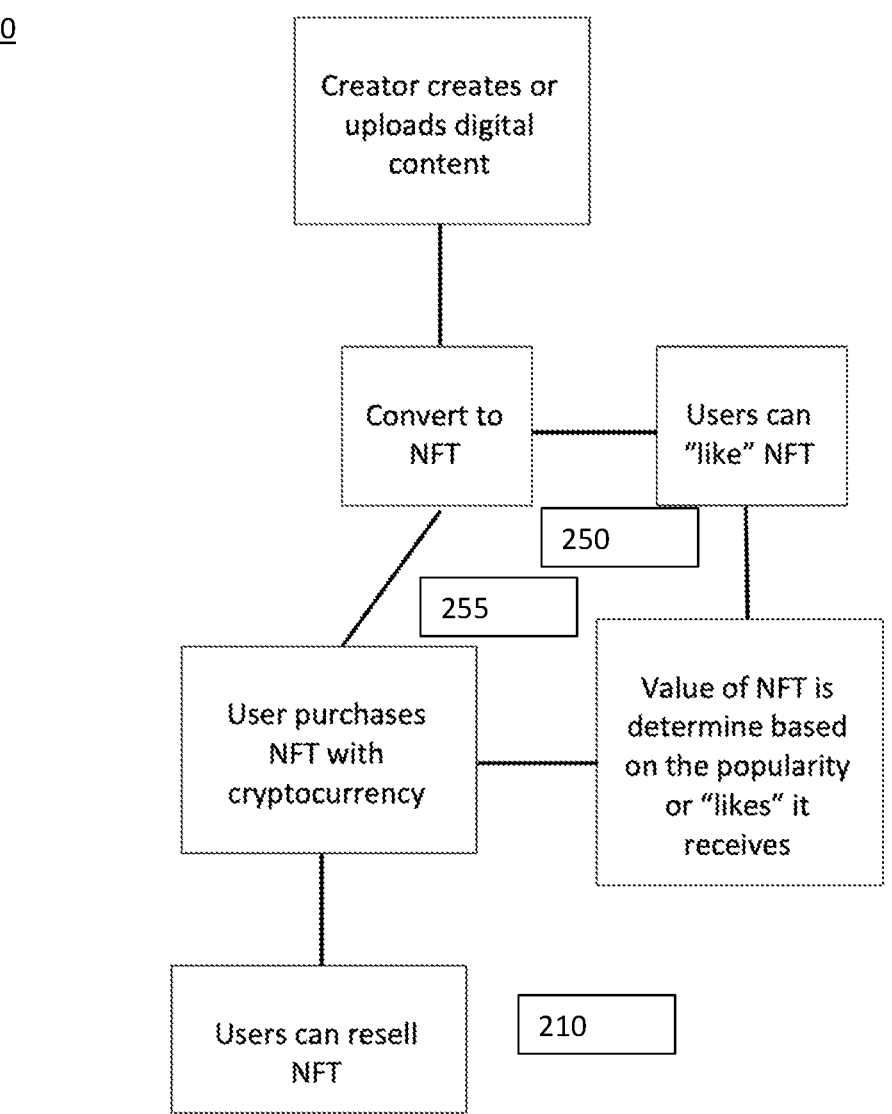
FIG. 2 illustrates a method of creating NFTs according to an embodiment of the invention.

Users may also post their digital content to a public forum within the platform 100 for all users of the augmented reality platform to view. FIG. 2 demonstrates a method 200 of creating and uploading digital content and minting or converting it as an NFT. The present invention allows users to convert digital content into an NFT and store it on Blockchain. As such, users can buy and sell AR content through the platform 100. Transactions are conducted through the platform 100 using cryptocurrency and Blockchain technologies, the implementation of which is readily apparent to one of ordinary skill in the art. In an exemplary embodiment of the present invention, the platform 100 utilizes a cryptocurrency for transactions involving computing power and resource sharing, sensor data sharing, cache memory sharing, and content sharing on a network. Transactions are recorded on a blockchain to ensure the security and integrity of the network. The preferred cryptocurrency Carbon12 or $C12 allows users to transact quickly without requiring verification from an external source. The peer-to-peer nature of the present invention reflects the paradigm shift toward Web3.0, and the use of cryptocurrency and Blockchain promote decentralized and democratized protocol. Additionally, cryptocurrency and blockchain technology allows users to securely exchange funds in real-time without requiring verification from an outside source, preventing waiting for payment verification to deliver a computation result. The network operates on a hyper-localized scale, utilizing processing power as close to the user as possible to reduce latency and provide feedback in real-time.

The NFT's value is determined by the number of interactions of other users with the NFT. For example, users may perform an action such as clicking a like, up-vote, or other rating systems that only counts user interactions, views, or likes on an NFT or other AR content. Another example of a liking system occurs by utilizing cryptocurrency, such as Carbon 12, which contributes likes or value to the NFT.

In an exemplary embodiment of the present invention, method 200 enables a user to create and upload custom AR content. Once the content is created, a module converts the digital content to NFT format, where users can interact with the content via a liking or rating system. Users can purchase the NFT content with cryptocurrency. The value of an NFT is determined based on the popularity of the NFT via a liking system, a counting system, or another similar system. After one sale, other users can sell the same NFT again to other users.

Additionally, when valuing NFTs, the value of digital content increases as the content gains more likes. Users can purchase these NFTs with cryptocurrency or trades using other NFTs. System 300 creates an entire network and uses multiple chains, one for commerce and transactions and one for data retrieval. The latter uses an Arweave 250 backend to maintain user content, data integrity, and security.

The Arweave 250 is a blockchain-type backend to retrieve cached data rather than URLs. Arweave 250 provides peer-to-peer media protocol technology and financially incentivized nodes across a network to share computing devices' unused storage space and store user files. Network 305 encourages creating and storing duplicates of files across multiple nodes for users to access files quickly regardless of internet connectivity. Each file has a unique "digital fingerprint," protecting it from being tampered with or altered. The Arweave 250 is powered by a blockweave 255. Just as a blockchain is a linked collection of blocks containing transactions, a blockweave 255 is specifically designed for the Arweave 250 protocol. The blockweave 255 is a set of data blocks and links to multiple previous blocks from the network. This data structure allows the network to enforce that miners (for cryptocurrency) must provide a Proof of Access (PoA) to old data to add new blocks. Unlike in a traditional blockchain, where miners must expend electricity to earn tokens, in the Arweave 250 network, miners are encouraged to replicate valuable data. This valuable data can include the information stored in the network to gain tokens. This mechanism offsets the value usually wasted in blockchain networks with practical and energy-efficient data storage. Arweave 250 allows for secure file storage and expedient data retrieval with or without internet connectivity. It also protects user data from exploitation by companies or alteration by bad actors and centralized authority while ensuring a convenient and efficient experience for the users themselves.

Furthermore, specific modules of the present invention may, alone or with resources of an associated backend, monitor computing resource control signaling and sharing between a communicatively coupled node and a control module. Herein, modules can be embodied as software and a computer program product or an application on a computing device, downloaded from the internet, or purchased. Monitoring beneficially detects when a specific node with user computing devices communicating with each other and sharing computing resources is about to hand over to another node. If the node is being handed over to a node with a different zone or geography, a module of the first node creates a zone or range, alone or with the support of application services. The module may determine which new zone the node is about to hand over. Optionally, a module of the first zone may contact a module in a new zone and may coordinate the transfer of active computing resource sharing.

Along with the state information, a module may transfer one or more user designations to enable a server application running on a node in the new zone to connect with the moving node's user requests. Where the leaving node's computing resource sharing is in the current zone, the transfer of state data, computing resources, and user identifier information enables a node in the new zone to connect with a user's device. It picks up the active user session where the server application in the previous zone left off. More generally, user session and computing resource sharing on a node moving between zones may be maintained by transferring computing resource data, such as session state data, from a first node in the first zone to a second node in the second zone.

A node, according to embodiments, may include computing resources such as operating memory, digital processing circuits, and data connectivity circuits for running one or more applications and sharing computing resources. Also, it may be adapted to allocate at least a portion of the node's computing resources to other users' computing devices and share computing resources. A node within a network, according to embodiments, may connect to and with other nodes in the same zone, to and with nodes in other zones, and with internet resources. User computing resource sharing to a specific node may be restricted to user applications and by user preferences and settings. Moreover, zone-specific DNSs associated with specific zones cause connection requests from a zone to a connected node in the same zone. In another instance, the connection requests come from a zone to a corresponding node in a different zone.

A user sharing computing resources via a computing device on a node may switch from a first zone to a second zone. The switching is maintained by transferring a corresponding computing resource sharing session of a first zone to a node of a second zone. The complementary computing resource sharing session is transferred by copying the user's computing device's shared resource data from the sharing session on the first zone and creating another sharing session with the copied session state data on a node of the second zone. These sharing session transfers may be achieved through steps performed by modules running on nodes within the first and second zones.

A node may include a module to manage the computing resource sharing system. In addition, the module may control switching between two or more nodes and zones. The node may route computing resources from one computing device to another computing device, shift computing resources from one computing device to another computing device, and a combination thereof.

The node may be decentralized and may connect with and to modules running on portions of each of multiple nodes spread across different zones. For example, at least one module is located in each zone which users in a zone group. The modules from each zone may communicate with at least one other module located in another zone. The communication may be in the form of TCP/IP packet transmission to a specific module or a zone group.

In addition, system 200 automates payment or settlement in the background while computing requests are calculated. The user can pre-configure settings in the system, for example, a maximum cost per kiloflop for purchasing or a minimum price for the resources when there is one provider or the same provider. In addition, the system extends to other selling and purchasing points like bandwidth and sensors. The system and payment also can be controlled to turn on and turn off at specified or scheduled times or on-demand. Provided that once a device becomes a node that consumes or sells, the user does not need to adjust settings. Thus, users receive instantaneous feedback even if the transaction is still occurring. Payment must occur for users to remain on the network—if a bad actor attempts to steal computing resources without compensation, they will be excluded from the network permanently.

Meanwhile, system 200 takes a small fee from every transaction used to pay node-only devices and covers losses from sellers who sold resources to a bad actor without being compensated. Additionally, system 200 features a security module 210. The security module protects users in case of bad actors on the network to prevent a loss of computing resources. The security module first determines if there is suspicious activity and flags a user or device as a "bad actor" that may be attempting to steal resources. Flagged profiles or devices are sent to a flagged profile or bad actor node list for each geography or location area. It then supplements fees from transactions from a cryptocurrency treasury that is stored in the system 200 to compensate if there is a theft. The security module repeats this process in a constantly occurring cycle to keep the minimum resources lost to micro-amounts that are not noticeable. Once the flagged profile node reaches a limit or predetermined threshold of users, devise, flagged profiles, or computing resource thefts, the entire node is dropped. This security module process that includes node dropping occurs within seconds; by the subsequent request, the flagged profile is not included, and/or that node is also not included. Thus, the security module protects users by only using a micro-amount of computing resources in case of a bad actor. Users view with the opportunity to reclaim autonomy over their data. They finally see the profit from sharing their data and determine which data is advertised to the network. Since system 300 is peer-to-peer, users will pay one another to utilize shared data and computing power, creating an ecosystem that circulates funds among users rather than funneling profit to corporations. For example, a user designates the type of computing resource the device sends and receives. Specifically, both a seller and a purchaser can determine the kind of computing resources and quality of service (QoS) parameters. Thus a user's device is not used while performing actions on it.

A user who needs computing power sends a request to the network, which will find users with available CPU for the desired price and automatically create a payment or settlement between the involved parties. The settlement can process in the background while the network delivers feedback instantaneously, circumventing delays from waiting for payment verification.

FIG. 3 illustrates a method 300 of recording a user in their immediate environment and transmitting a user's likeness, in 3D, to other users. A recording module allows a user to record themselves in an AR format. The recorded content is then displayed in different environments using a computing device with video displaying capabilities.

Figure 4:
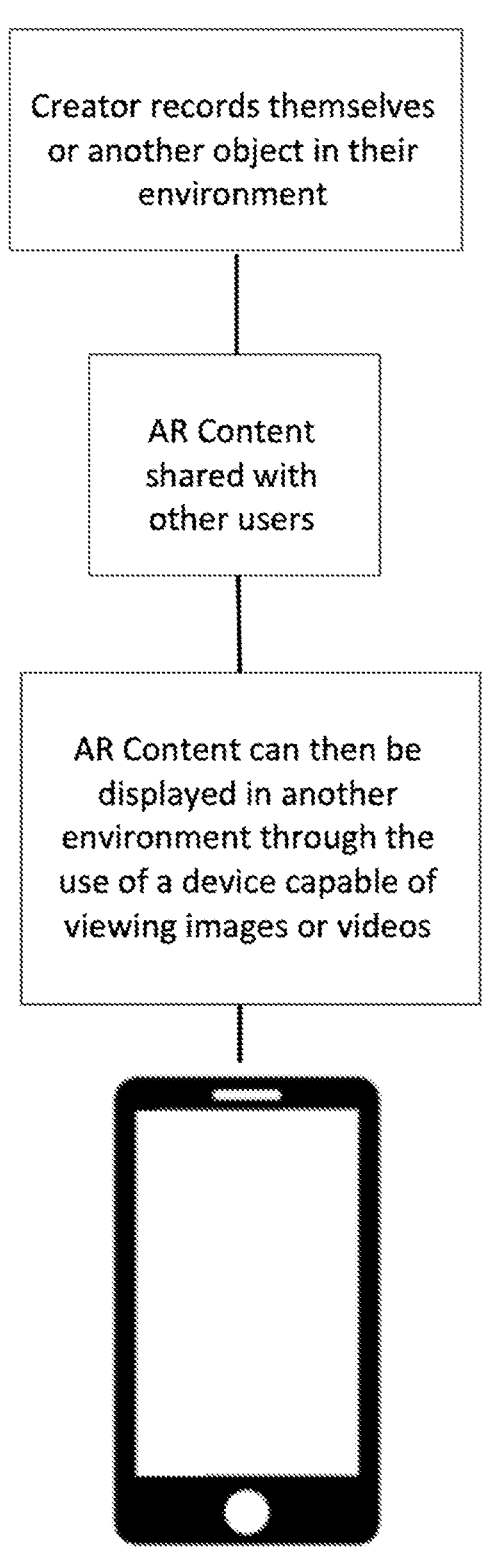
FIG. 4 illustrates a method of creating individual AR content that can be shared in different environments and with other users, according to an embodiment of the invention.

FIG. 4 illustrates that the recording module processes 3D augmented reality renderings to be displayed in the user's physical environment while also enabling 3D content to be viewed in 2D on a traditional streaming platform. The present invention allows users to view content in 2D by analyzing and transmitting data from the second stream within a, for example, MPEG file that contains the 3D model. Thus, users can change the angle at which they are viewing the 2D video. Because the 3D model is stored within the same file as the 2D default data, users can rotate and manipulate the 2D video and view it from any angle captured in the 3D rendering. The backward compatibility and unique storage and transmission protocols of the platform make manipulation of the viewing angle possible so that users can view a 360-degree image of the digital content they are displaying.

In an exemplary embodiment and with reference to FIGS. 3 and 4, to create AR content, a user records themselves via a computing device. The recording must be of a user or other object in their environment. The recording is converted and transformed into AR content that is displayed in another environment via a computing device that is specifically capable of viewing images and videos. Therefore, the AR content can be adapted to any environment and then shared with other users. In an alternative embodiment and with reference to FIG. 4, the method 400 enables a user to record themselves as digital content or another object in their environment. Then the content is converted to AR format and shared with other users. After sharing, the AR content is displayed on a computing device, but advantageously, a user can add or edit the AR content with their own unique background or environment.

While the invention has been described in connection with a number of embodiments and implementations, the invention is not so limited but covers various apparent modifications and equivalent arrangements, which fall within the purview of the appended claims. Although features of the invention are expressed in certain combinations among the claims, it is contemplated that these features can be arranged in any combination and order. The invention has been described herein using specific embodiments for illustrative purposes only. It will be readily apparent to one of ordinary skill in the art, however, that the principles of the invention can be embodied in other ways. Therefore, the invention should not be regarded as limited in scope to the specific embodiments disclosed herein; it should be fully commensurate in scope with the following claims.

We claim:

1. A method of creating an Augmented Reality (AR) digital content platform comprising the steps of:
   creating a digital content including at least one video file;
   recording the digital content;
   storing the digital content;
   separating the at least one video file into a two-dimensional (2D) video file and a three-dimensional (3D) video file;
   wherein a first frame of the 3D video file stores an entire 3D object and inference of a point cloud orientation;
   storing changes in coordinates of point cloud data from the first frame to each subsequent frame in the 3D video file;
   transmitting the 2D video file, the first frame of the 3D video file, and the changes in the coordinates of the point cloud data between a first computing device and a second computing device; and
   implementing a valuation system that, in real-time, determines a value of the digital content.

2. The method of creating the AR digital content platform of claim 1, wherein the digital content is 3D digital content.

3. The method of creating the AR digital content platform of claim 2, wherein the 3D digital content is a non-fungible token (NFT).

4. The method of creating the AR digital content platform of claim 1, further comprising the step of purchasing the digital content via cryptocurrency.

5. The method of creating the AR digital content platform of claim 1, further comprising the step of presenting an AR Graphical User Interface.

6. The method of creating the AR digital content platform of claim 5, wherein the step of presenting the AR Graphical User Interface comprises an AR storefront to purchase the digital content.

7. The method of creating the AR digital content platform of claim 1, further comprising the step of recording the digital content through the first computing device comprising a camera.

8. The method of creating the AR digital content platform of claim 7, wherein the step of recording the digital content through the first computing device comprising the camera is selected from the group consisting of a mobile phone, a tablet, or a head-mounted display.

9. The method of creating the AR digital content platform of claim 1, wherein the digital content is displayed in a user's environment through the first computing device.

10. The method of creating the AR digital content platform of claim 1, wherein the point cloud data is animated.

11. The method of creating the AR digital content platform of claim 1, wherein the at least one video file comprises multiple streams of data in an accessible Moving Picture Experts Group (MPEG) file.

12. The method of creating the AR digital content platform of claim 11, wherein the multiple streams of data are compressed and capable of being transmitted between computing devices.

13. The method of creating the AR digital content platform of claim 1, wherein the digital content is minted as a non-fungible token (NFT).

14. A method of valuing a digital content comprising the steps of:

creating the digital content including at least one video file;

recording the digital content;

storing the digital content;

separating the at least one video file into a two-dimensional (2D) video file and a three-dimensional (3D) video file;

wherein a first frame of the 3D video file stores an entire 3D object;

storing changes in coordinates of position data of the entire 3D object from the first frame to each subsequent frame in the 3D video file;

transmitting the 2D video file, the first frame of the 3D video file, and the changes in the coordinates of the position data between a first computing device and a second computing device;

implementing a valuation system that, in real-time, determines a value of the digital content via an Arweave backend; and utilizing a blockweave to perform transactions that increase the value of the digital content.

15. A method of minting a digital content comprising the steps of:

creating the digital content including at least one video file;

recording the digital content;

storing the digital content via a storage module;

separating the at least one video file into a two-dimensional (2D) video file and a three-dimensional (3D) video file;

wherein a first frame of the 3D video file stores an entire 3D object;

storing changes in coordinates of position data of the entire 3D object from the first frame to each subsequent frame in the 3D video file;

transmitting the 2D video file, the first frame of the 3D video file, and the changes in the coordinates of the position data between a first computing device and a second computing device;

converting the digital content to an AR compatible format via a converting module; and sharing the digital content between the first computing device and second computing device via a sharing module.

16. The method of minting the digital content of claim 15, wherein the step of sharing the digital content comprises sharing sensor data selected from a group consisting of: Complementary Metal-Oxide-Semiconductor (CMOS), Light Detection and Ranging (LiDAR), accelerometer, gyroscope, time-of-flight, and Global Positioning System (GPS) data.

* * * * *